Aug. 14, 1923.

J. M. BEALE 1,464,594

LIFE GUARD FOR VEHICLES

Filed March 16, 1922  2 Sheets-Sheet 1

Inventor
James M. Beale
By Attorney H. Anderson

Aug. 14, 1923.

J. M. BEALE

LIFE GUARD FOR VEHICLES

Filed March 16, 1922

1,464,594

2 Sheets-Sheet 2

Inventor
James M. Beale
By Attorney

Patented Aug. 14, 1923.

1,464,594

UNITED STATES PATENT OFFICE.

JAMES M. BEALE, OF PEEKSKILL, NEW YORK.

LIFE GUARD FOR VEHICLES.

Application filed March 16, 1922. Serial No. 544,355.

*To all whom it may concern:*

Be it known that I, JAMES M. BEALE, a citizen of the United States, residing at Peekskill in the county of Westchester and State of New York, have invented new and useful Improvements in Life Guards for Vehicles, of which the following is a specification.

My invention relates particularly to automobiles but is applicable to vehicles generally that ply the public roads. It has for its object, primarily, a life-guard for vehicles, that is a guard that will contribute to the diminishing of harm that occurs to bodies that are struck by automobiles or other vehicles in motion.

The principal feature of this invention is the facing of a guard with rubber or other elastic substance, preferably rubber tubing, with the object of producing a surface that shall be as different from a metallic bar in striking, as a boxing glove differs from a bare fist. After first providing the rubber contacting surface there are other features of the invention that will add to the advantages of the soft, first contact, since the real object of the invention is to afford some protection to the pedestrian, it appearing that guards as applied to the fronts of automobiles are all for the protection of the vehicles, and the construction of said fronts make of them complete traps for unfortunates who get in contact with them.

The objects of the invention are attained by the means set forth in this specification and the accompanying drawings.

Figure 1:
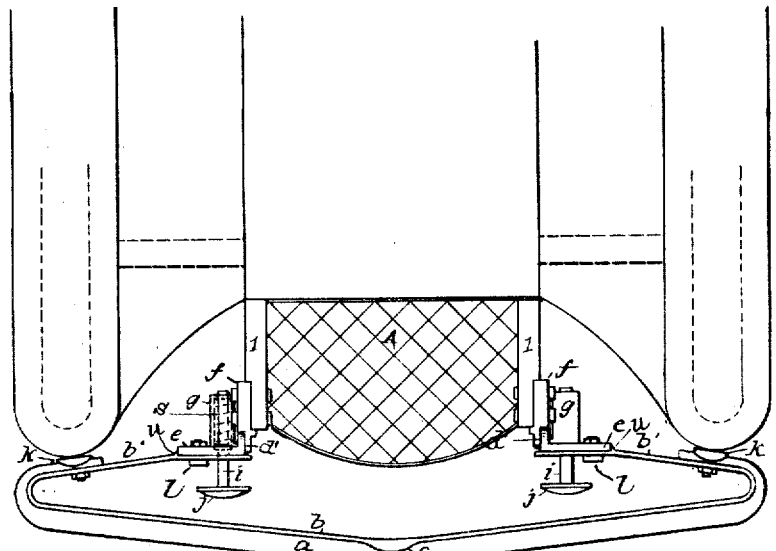
Figure 2:
Figure 3:
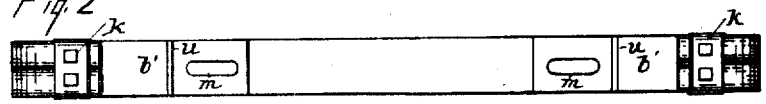
Figure 4:
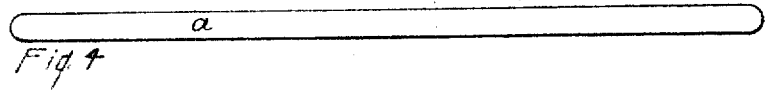
Figure 5:
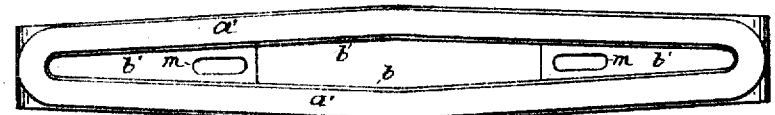
Figures 6, 7, 8:
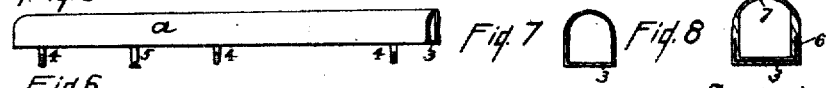
Figure 10:
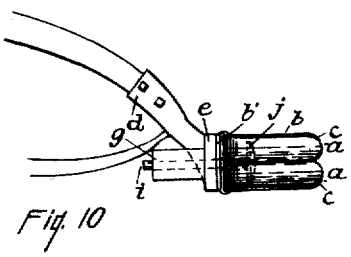
Figure 11:
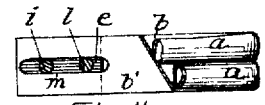
Figure 12:
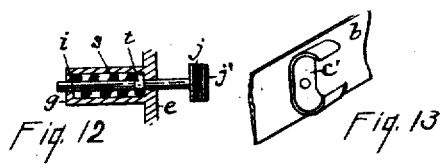
Figure 13:
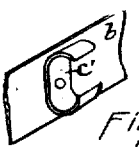
Figure 14:
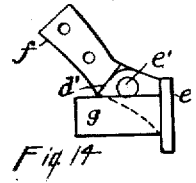
Figure 15:
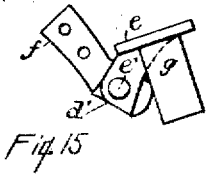

Fig. 1 of the drawings is a plan of the forward end of an automobile with this invention attached thereto. Fig. 2 is a front elevation of a principal feature of the invention. Fig. 3 is an elevation of the reverse side of Fig. 2. Fig. 4 is an elevation of a rubber tube for use as a part of the life-guard. Fig. 5 is a front elevation of a form of the life-guard modified from that in Fig. 2. Fig. 6 is an elevation, partly in section, of the tube shown in Fig. 4. Figs. 7 and 8 are transverse sections of tubes as in Fig. 6, upon an enlarged scale. Sheet 2 Fig. 9, indicates what happens to this life-guard when it meets an obstruction. Fig. 10 is a side elevation of the life-guard. Fig. 11 is a section of an end of the life-guard in elevation, explanatory of its attachment to its supporting brackets. Fig. 12 is a longitudinal section of a secondary shock absorber as a part of the combination. Fig. 13 is a detail upon an enlarged scale relating to means for holding fast the tubes on the guard bar. Figs. 14 and 15 are details upon an enlarged scale, relating to the swivel brackets to which the life-guard is attached.

The first aim is to attain a high efficiency of elasticity in this life-guard. The simplest form for using rubber facing is to apply it to any guard bar as in Fig. 1. To add to the cushioning effect of the rubber it is herein shown as applied to a resilient bar $b$, having backwardly extended arms $b'$ $b'$. These arms are attached to brackets $e f$ that are secured to the chassis beams 1 1. The arms are secured to the brackets by the bolts $l$ $l$. At $u$ $u$, Figs. 1 2 and 3, are shown projections $u$ on said arms that butt against the ends $c$ of the brackets, to prevent the bar from sliding bodily laterally. When force is applied to the life-guard in front, causing the bar to bend inwardly, the arms $b'$ $b'$ will be forced to spread outwardly on their bearings, as indicated at 2, Fig. 9. The reverse sides of the said arms are presented in Fig. 3, in which are shown slots $m$ $m$ through which the bolts $t$ pass, the heads of the bolts being large and hugging close to the surfaces of the arms, tightly enough to prevent rattling, yet permitting the arms to be slidable under them. Fig. 11 represents a section of a bar, showing that the construction exhibited herein admits the stem $i$ of the bumper to pass through the slot $m$.

Figure 9:
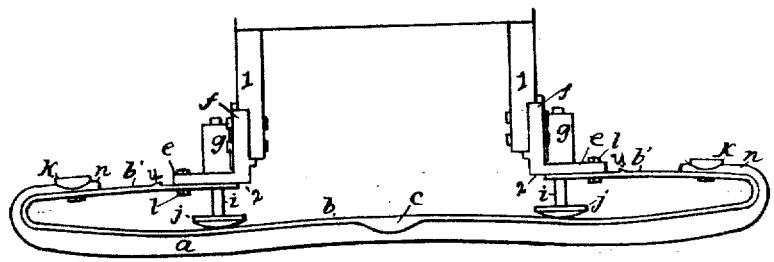

The bar $b$ $b'$ $b'$ can be so thin and yielding that it will give to a comparatively mild blow, and will assume the position shown in Fig. 9—its angularity would be flattened, the bar arms $b'$ $b'$ would be bent backwards, the bar $b$ would contact with the bumpers $j$, so that this life-guard as thus far described, affords an elastic rubber cushion backed by a yielding support, the cumulative resiliency of the two bodies tending in a large measure to soften a blow to a person.

Preferably, though not necessarily, the guard-bar is given an angular form with the apex extended beyond the center of the front of the vehicle, as in Fig. 1. The amount of the angularity to be a matter of judgment in the construction and its particular application, since such a form will tend more to throw a body away from in front of a vehicle, lessening the liability of a body being knocked down and run over. The height of the application of the life-guard, as in Fig.

10, to be about the height of the front axle of the vehicle, should have regard to avoiding its being a hindrance to going over uneven places, yet preferably low enough to strike adults below the knees, so there would be a tendency to trip them and cause them to fall over the life-guard upon the netting A, Fig. 1, rather than to be thrown down upon a pavement or hard road-bed.

Any guard on the front of an automobile is desired to be and needs to be some protection to the vehicle, which is liable in parking and in many ways to bump against other vehicles and obstructions. Therefore, this life-guard has a reinforcement next the vehicle, in the form of bumpers $j, j$, Figs. 1 9 10 and 12. To the brackets $e$ $f$ cylinders $g$, Figs. 1 9 11 14 and 15 are attached, or they may be integral with the brackets or separate from the brackets. The bumper $j$, Fig. 12, is secured to a stem $i$ that extends through the heads of the cylinder. Inside the cylinder is a collar $t$ fast on the stem, and a stout spring $s$ on the stem within the cylinder pressing against the collar keeps the bumper extended as shown. This combination, which comes into play when the bar $b$ makes forcible contact with and presses against the bumpers, becomes a shock absorber, only limited in its power of resistance by the combined resiliency of the rubber, the bar $b$ $b'$ $b'$ and the springs $s$. Some additional cushioning can be obtained by attaching rubber blocks on the bumpers, the shaded part $j'$, Fig. 12 representing a rubber facing.

In the application of rubber tubing to the guard bar, Fig 1 illustrates a plain soft rubber tube, of a commercial variety, attached to this or any guard bar. By means of clamps $k$, Figs. 1 3 9 and 10, the ends $n$ of the tubing can be secured as shown to the arms $b'$ $b'$, and a sufficient means of support to keep the tube in place on the front of the part $b$ of the bar, are lips $c$, Figs. 1 2 9 10, are made integral with the bar, to envelop just enough of the periphery of the tube to hold it in place. Or, the lips can be obtained by attaching clips, as $c'$, Fig. 13, to the guard bar. The tubes may be applied singly, or there may be two or more, as in Figs. 2 5 10 and 11, according to the width of the bar; and the more tubing there is of course the better the cushioning.

Preferably, however, a tube would be made expressly for and adapted to the purpose, as in Figs. 4, 5 and 6. Figs. 4 and 5 represent tubes in plan and Fig. 6 represents part of a tube in elevation and transverse section. In making the tube it would be given, preferably, a flat base, as at 3, Figs. 6 7 and 8. The ends of the tubes would be closed, and bolts, as at 4, Fig. 6, would have their heads embedded in the material of the tube—the bolts for securing the tubes to the guard bars. At 5, Fig. 6, is shown an air valve for application to tubes made to be inflated, that is, life-guard pneumatic tubes. In Fig. 5 an endless tube is represented as doubled on a divided bar. In Fig. 7 is given in transverse section the preferable form for tubes made for this purpose, whether of lengths to be cut off or of the pneumatic kinds. In Fig. 8 an inflatable tube partly fibrous is shown, the line 6 representing canvas or other fibre embedded in the base and partly in the sides of the tube, the top 7 of the tube to be of soft rubber. Figs. 7 and 8 are upon an enlarged scale. The safety netting A is attached to the chassis framing.

Means are provided for swinging the life-guard to a vertical position when, for any reason the vehicle is limited for space lengthwise, as in close parking, and in garages that have little more than space for the vehicle. The means consist of making the brackets $e$ $f$ in two parts and uniting the two by means of a swivel joint, as at $d'$ $d'$, Figs. 1 14 and 15, the latter two figures representing the brackets upon an enlarged scale. The combined parts $e$ $g$ swing upon a pivot $e'$ that joins it to the part $f$. Figs. 1 and 14 represent the brackets in normal position, and Fig. 15 represents the position of the parts $e$ and $g$ when elevated.

Parts entering into this invention will necessarily have to undergo more or less departure from the actual forms and applications just as they are exhibited herein, which is possible without affecting the principles of my invention.

Having described my invention, what I claim and desire to secure by Letters Patent, is the following:

1. The combination in a life-guard for vehicles, of a spring bar, turned back ends of the said bar, the said ends slotted, brackets secured to the vehicle and the said bar ends slidably secured to the brackets, cylinders combined with said brackets, bumpers and stems on the bumpers extended through the cylinders, collars on the stems, springs around the stems impinging against the collars and elastic tubes on the bar, clamps on the turned back ends of the bar to secure the turned back ends of the said tubes, and means at the middle of the bar to support the tubes.

2. In combination in a life-guard, the frame of a vehicle, brackets secured to the frame, a cylinder combined with the brackets, stems through the cylinders, collars on the stems, springs within the cylinders impinging against the collars, bumpers on the stems and a spring bar with backwardly turned arms, the arms slotted and slidably secured to the said brackets.

3. In combination, in a life-guard for vehicles, the frame of the vehicle, brackets secured to the frame, a swivel joint in the brackets, a spring bar, turned back ends of the bar, the said ends slotted and slidably secured to the brackets, bumpers back of the spring bar, a spring cushion for the bumpers, means on the brackets for supporting the bumpers and springs, and an elastic body on the face of the spring bar.

4. The combination in a life-guard for vehicles of the vehicle frame, swiveled brackets secured to the frame, a guard bar, turned back ends of the guard bar, said ends slotted and slidably secured to the said brackets, and pneumatic tubes attached to the face of the guard bar.

5. The combination in a life-guard comprising brackets secured to the frame of the vehicle and a spring bar attached to the brackets as described, of bumpers to be acted upon by the said bar, spring cushions for the bumpers, and means on the brackets for supporting the bumpers and the said cushions.

6. The combination in a life-guard for vehicles, of the frame of the vehicle, brackets secured to the frame, a spring bar, backward turns of the ends of the bar, the said ends slotted and secured to the brackets and longitudinally slidable on the brackets.

7. The combination in a life-guard for vehicles, of the frame of the vehicle, brackets secured to the frame, and a spring bar, the ends of the bar turned backwards, the ends slotted and slidably secured to the brackets, the ends longitudinally slidable on the brackets, and an elastic body on the face of the bar.

8. The combination in a life-guard for vehicles, of the frame of the vehicle, brackets secured to the frame, and a spring bar, backward turns of the ends of the bar, the ends slotted and slidably secured to the brackets, and limiting stops on the ends adjacent to the slots for lodgement against the brackets, the ends longitudinally slidable on the brackets.

9. In a life guard for vehicles the combination of the frame of the vehicle, brackets secured to the frame, a spring bar across the end of the vehicle, the ends of the spring bar turned backwards, the said ends slotted and slidably secured to the said brackets, an elastic member on the face of the bar, and means for securing the elastic member to the bar.

10. In a life guard for vehicles, the vehicle frame, brackets secured to said frame, a spring bar secured to the brackets, and a pneumatic tube on the face of the spring bar, the tube comprising a flat base, perpendicular sides and a semi-circular top, the base made partly of fabric, the sides embodying fabric part way from the base blending into the elastic top, and means for securing the tube to the spring bar.

11. The combination in a life saving guard for vehicles, of a pneumatic tube, an elastic spring bar across the end of the vehicle, the said tube secured to the said spring bar, the ends of the spring bar bent backwards and inwardly, the said ends slidably secured to brackets, the brackets secured to the frame of the vehicle, and reinforcing bumpers attached to the said brackets to receive the backward thrusts of the spring bar.

Signed at Peekskill, in the county of Westchester and State of New York, March 1922.

JAMES M. BEALE.